US 6,661,113 B1

(12) United States Patent
Bonin

(10) Patent No.: US 6,661,113 B1
(45) Date of Patent: Dec. 9, 2003

(54) POWER GENERATOR

(76) Inventor: Walter E. Bonin, P.O. Box 980483, West Sacramento, CA (US) 95798

( * ) Notice: Subject to any disclaimer, the term of this patent is extended or adjusted under 35 U.S.C. 154(b) by 154 days.

(21) Appl. No.: 09/944,043

(22) Filed: Aug. 31, 2001

(51) Int. Cl.[7] .................................................. F03D 9/00
(52) U.S. Cl. ........................................... 290/55; 290/44
(58) Field of Search ............................ 290/55, 44, 1 R

(56) References Cited

U.S. PATENT DOCUMENTS

| | | | |
|---|---|---|---|
| 4,096,698 A | * 6/1978 | Martin | 60/641.12 |
| 4,119,863 A | * 10/1978 | Kelly | 290/55 |
| D252,572 S | 8/1979 | Hanson | |
| 4,184,894 A | 1/1980 | Lindmayer et al. | |
| 4,229,941 A | * 10/1980 | Hope | 60/641.15 |
| 4,236,083 A | * 11/1980 | Kenney | 290/55 |
| 4,244,750 A | 1/1981 | Chenevas-Paule et al. | |
| 4,551,631 A | * 11/1985 | Trigilio | 290/55 |
| 4,742,291 A | 5/1988 | Bobier et al. | |
| 5,075,564 A | * 12/1991 | Hickey | 290/55 |
| 5,203,746 A | 4/1993 | Lehnert | |
| 5,225,712 A | 7/1993 | Erdman | |
| 5,394,016 A | * 2/1995 | Hickey | 290/55 |
| 6,016,015 A | 1/2000 | Willard, Jr. | |
| 6,177,735 B1 | * 1/2001 | Chapman et al. | 290/44 |

* cited by examiner

*Primary Examiner*—Nestor Ramirez
*Assistant Examiner*—Nguyen Hanh

(57) ABSTRACT

A power generator includes a base assembly that has a lower portion and an upper portion. The lower portion is for supporting the upper portion of the base assembly. A solar assembly is coupled to the upper portion of the base assembly. A power storage assembly is operationally coupled to the solar assembly. The power storage assembly is for storing electricity from the solar assembly. The power storage assembly is positioned with in the lower portion of the base assembly such that the lower portion of the base assembly is for protecting the-power storage assembly from adverse weather. A turbine assembly is coupled to the upper portion of the base assembly. The turbine assembly is for producing electricity from wind. The turbine assembly is operationally coupled to the power storage assembly such that the power storage assembly is for storing electricity produced from the turbine assembly.

20 Claims, 7 Drawing Sheets

POWER GENERATOR

BACKGROUND OF THE INVENTION

1. Field of the Invention

The present invention relates to turbine generator apparatuses and more particularly pertains to a new power generator for allowing a user to provide electrical power to roadway lights in remote areas.

2. Description of the Prior Art

The use of turbine generator apparatuses is known in the prior art. More specifically, turbine generator apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,016,015; U.S. Pat. No. 5,225,712; U.S. Pat. No. 5,203,746; U.S. Pat. No. 4,244,750; U.S. Pat. No. 4,184,894; U.S. Pat. No. Des. 252,572; and U.S. Pat. No. 4,472,291.

While these devices fulfill their respective, particular objectives and requirements, the aforementioned patents do not disclose a new power generator. The inventive device includes a base assembly that has a lower portion and an upper portion. The lower portion is adapted for resting on a support surface. The lower portion is for supporting the upper portion of the base assembly. A solar assembly is coupled to the upper portion of the base assembly. The solar assembly is adapted for collecting solar radiation and converting the solar radiation into electricity. A power storage assembly is operationally coupled to the solar assembly. The power storage assembly is adapted for storing electricity from the solar assembly. The power storage assembly is positioned with in the lower portion of the base assembly such that the lower portion of the base assembly is adapted for protecting the power storage assembly from adverse weather. A turbine assembly is coupled to the upper portion of the base assembly. The turbine assembly is adapted for producing electricity from wind. The turbine assembly is operationally coupled to the power storage assembly such that the power storage assembly is adapted for storing electricity produced from the turbine assembly.

In these respects, the power generator according to the present invention substantially departs from the conventional concepts and designs of the prior art, and in so doing provides an apparatus primarily developed for the purpose of allowing a user to provide electrical power to roadway lights in remote areas.

SUMMARY OF THE INVENTION

In view of the foregoing disadvantages inherent in the known types of turbine generator apparatuses now present in the prior art, the present invention provides a new power generator construction wherein the same can be utilized for allowing a user to provide electrical power to roadway lights in remote areas.

The general purpose of the present invention, which will be described subsequently in greater detail, is to provide a new power generator apparatus and method which has many of the advantages of the turbine generator apparatuses mentioned heretofore and many novel features that result in a new power generator which is not anticipated, rendered obvious, suggested, or even implied by any of the prior art turbine generator apparatuses, either alone or in any combination thereof.

To attain this, the present invention generally comprises a base assembly that has a lower portion and an upper portion. The lower portion is adapted for resting on a support surface. The lower portion is for supporting the upper portion of the base assembly. A solar assembly is coupled to the upper portion of the base assembly. The solar assembly is adapted for collecting solar radiation and converting the solar radiation into electricity. A power storage assembly is operationally coupled to the solar assembly. The power storage assembly is adapted for storing electricity from the solar assembly. The power storage assembly is positioned within the lower portion of the base assembly such that the lower portion of the base assembly is adapted for protecting the power storage assembly from adverse weather. A turbine assembly is coupled to the upper portion of the base assembly. The turbine assembly is adapted for producing electricity from wind. The turbine assembly is operationally coupled to the power storage assembly such that the power storage assembly is adapted for storing electricity produced from the turbine assembly.

There has thus been outlined, rather broadly, the more important features of the invention in order that the detailed description thereof that of allows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new power generator apparatus and method which has many of the advantages of the turbine generator apparatuses mentioned heretofore and many novel features that result in a new power generator which is not anticipated, rendered obvious, suggested, or even implied by any of the prior art turbine generator apparatuses, either alone or in any combination thereof.

It is another object of the present invention to provide a new power generator, which may be easily and efficiently manufactured and marketed.

It is a further object of the present invention to provide a new power generator, which is of a durable and reliable construction.

An even further object of the present invention is to provide a new power generator which is susceptible of a low cost of manufacture with regard to both materials and labor, and which accordingly is then susceptible of low prices of sale to the consuming public, thereby making such power generator economically available to the buying public.

Still yet another object of the present invention is to provide a new power generator, which provides in the apparatuses and methods of the prior art some of the advantages thereof, while simultaneously overcoming some of the disadvantages normally associated therewith.

Still another object of the present invention is to provide a new power generator for allowing a user to provide electrical power to roadway lights in remote areas.

Yet another object of the present invention is to provide a new power generator, which includes a base assembly that has a lower portion and an upper portion. The lower portion is adapted for resting on a support surface. The lower portion is for supporting the upper portion of the base assembly. A solar assembly is coupled to the upper portion of the base assembly. The solar assembly is adapted for collecting solar radiation and converting the solar radiation into electricity. A power storage assembly is operationally coupled to the solar assembly. The power storage assembly is adapted for storing electricity from the solar assembly. The power storage assembly is positioned within the lower portion of the base assembly such that the lower portion of the base assembly is adapted for protecting the power storage assembly from adverse weather. A turbine assembly is coupled to the upper portion of the base assembly. The turbine assembly is adapted for producing electricity from wind. The turbine assembly is operationally coupled to the power storage assembly such that the power storage assembly is adapted for storing electricity produced from the turbine assembly.

Still yet another object of the present invention is to provide a new power generator that would enable remote areas of interstate highways to be illuminated, thereby improving safety and reducing accidents.

Even still another object of the present invention is to provide a new power generator that would be of a self-contained design that would make it easier to setup than other systems.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
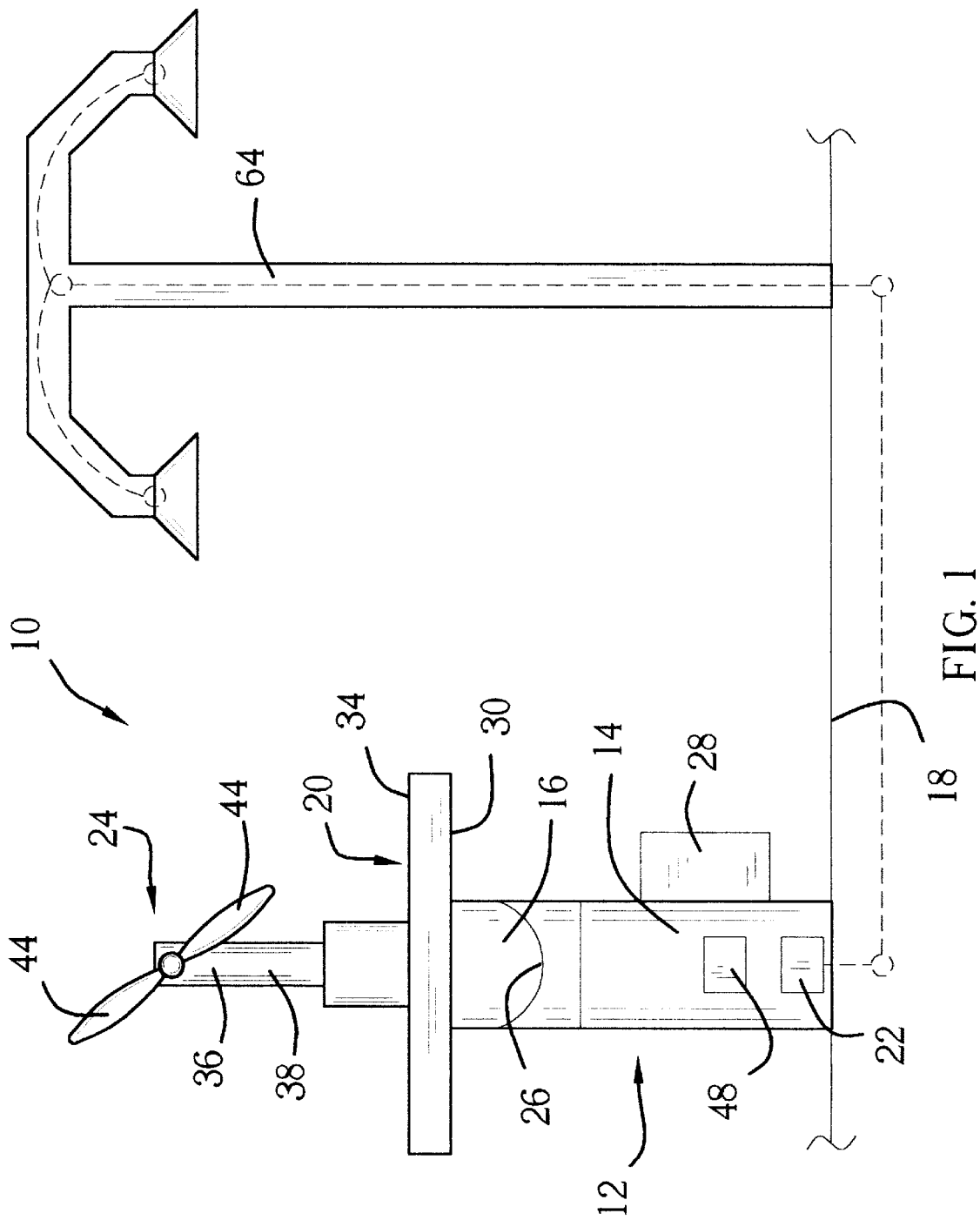
FIG. 1 is a side view of a new power generator according to the present invention.
Figure 2:
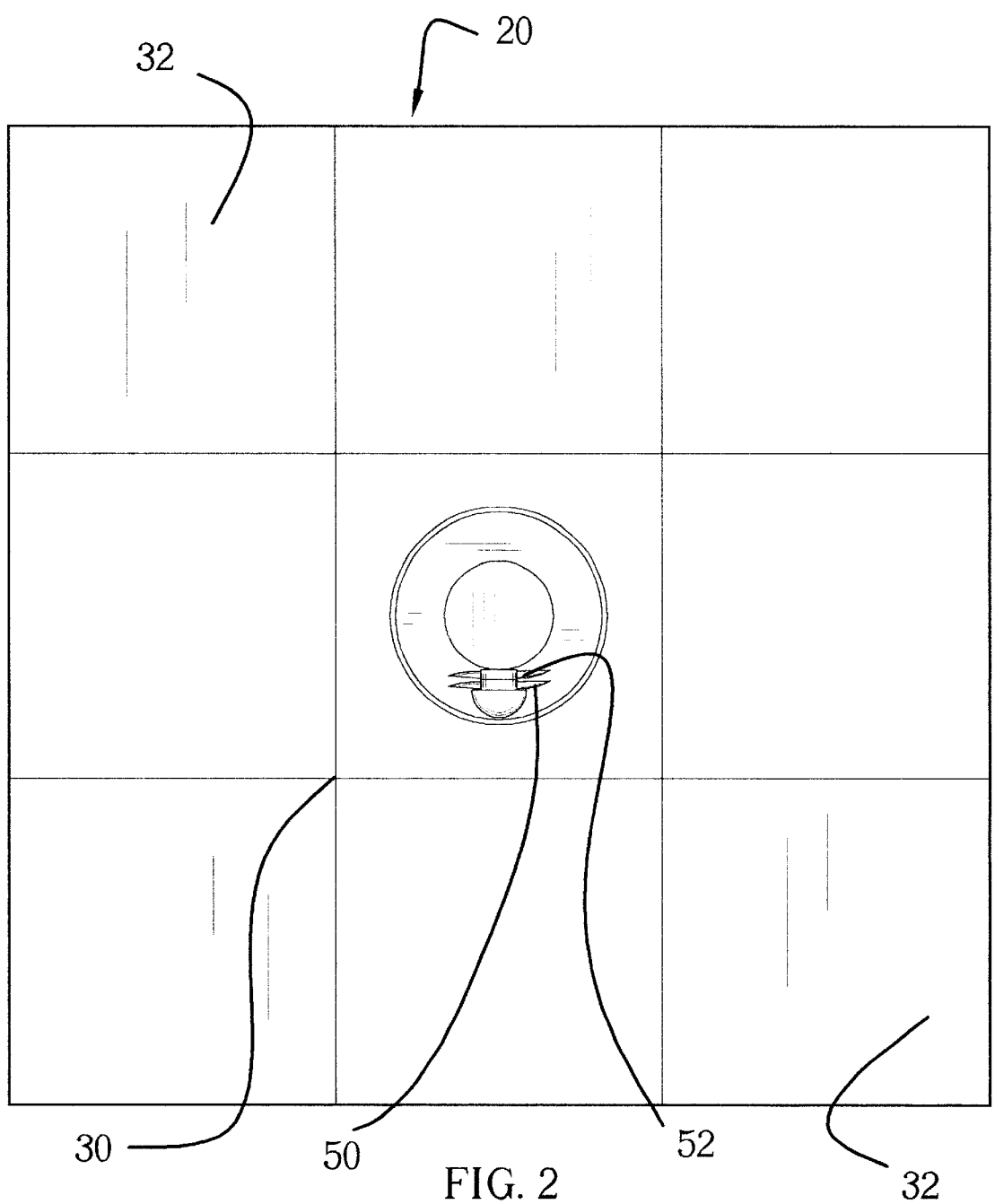
FIG. 2 is a top view of the present invention.
Figure 3:
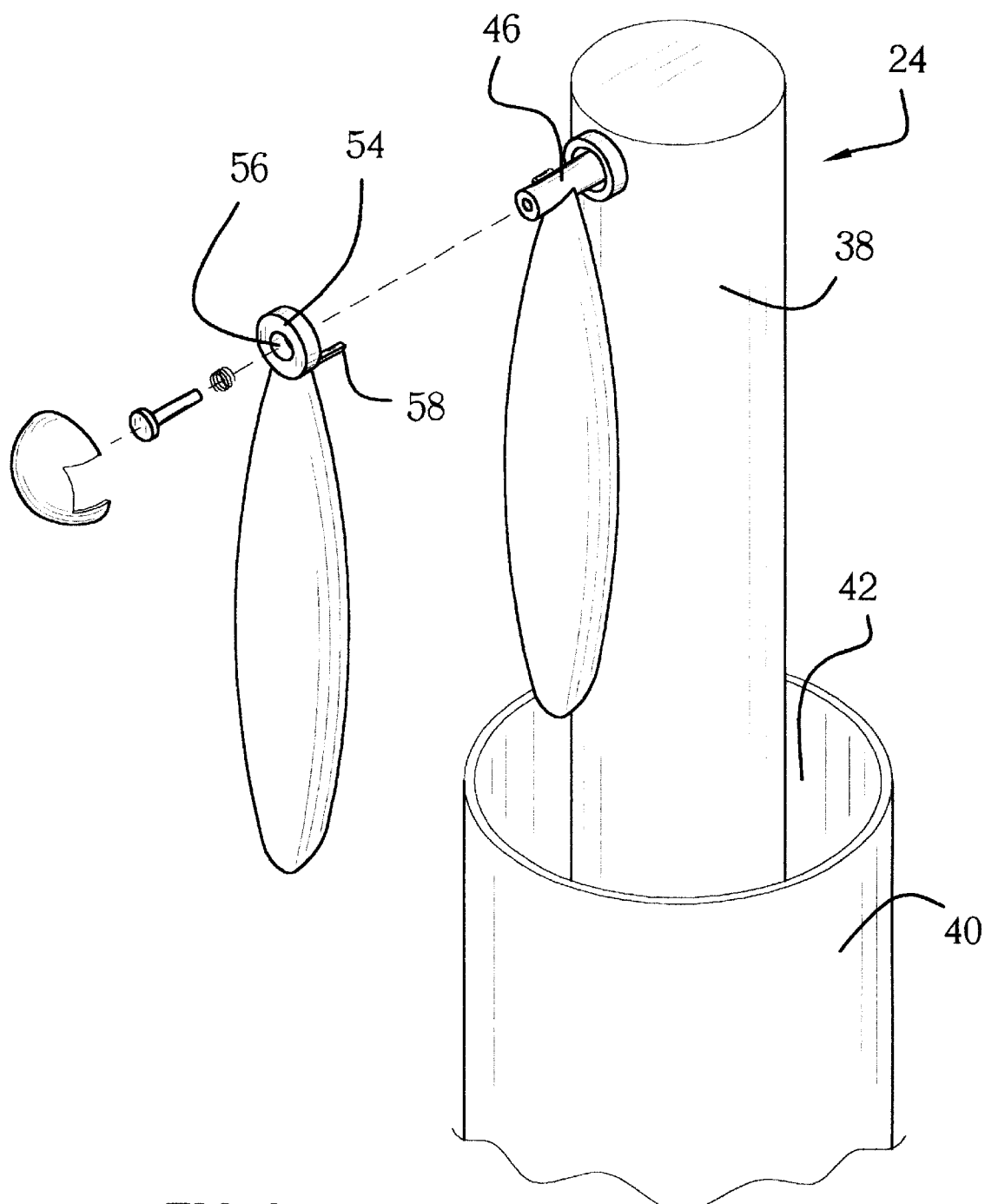
FIG. 3 is an exploded view of the present invention.
Figure 4:
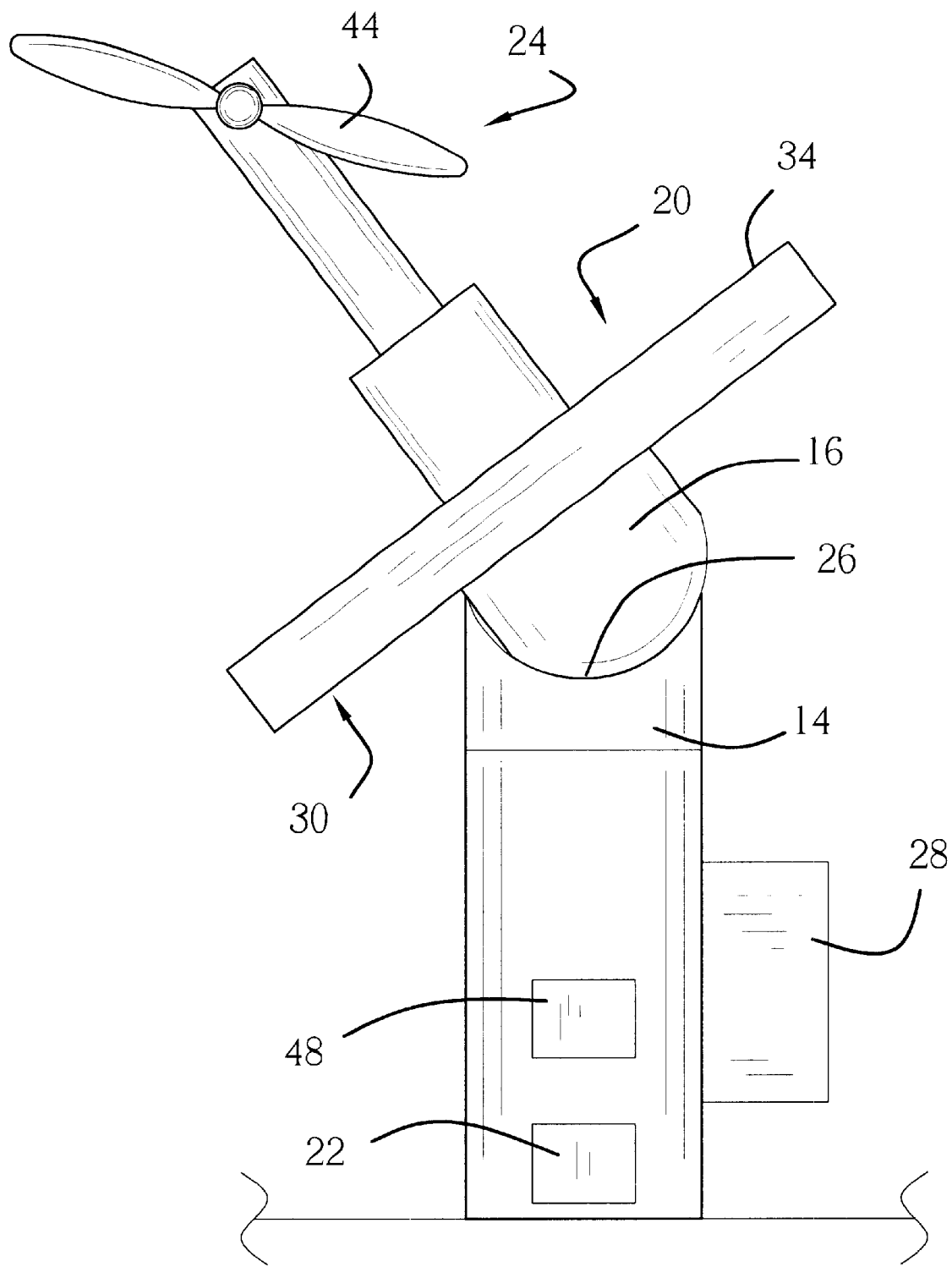
FIG. 4 is a side view of the present invention.
Figure 5:
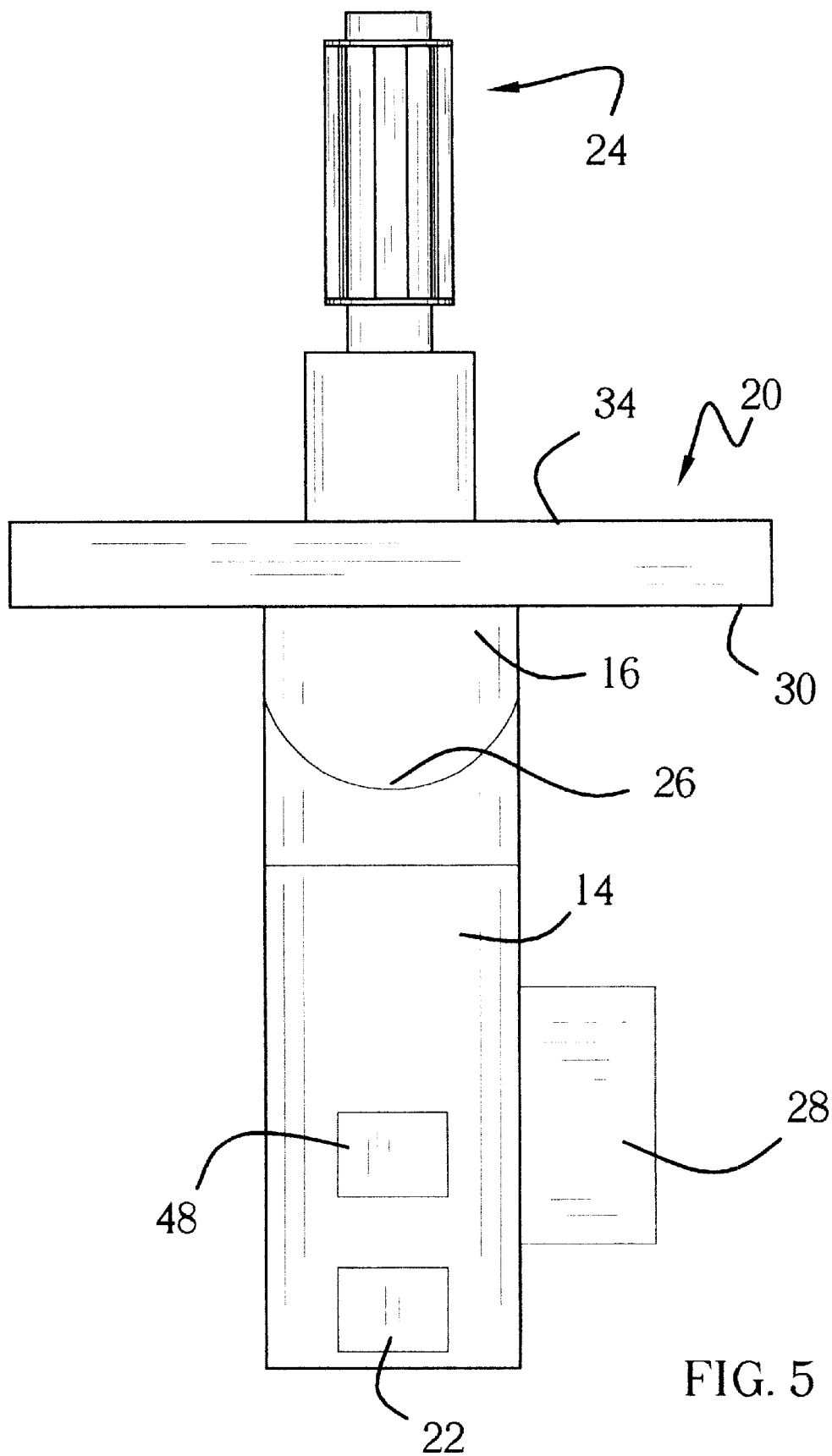
FIG. 5 is a side view of the present invention.
Figure 6:
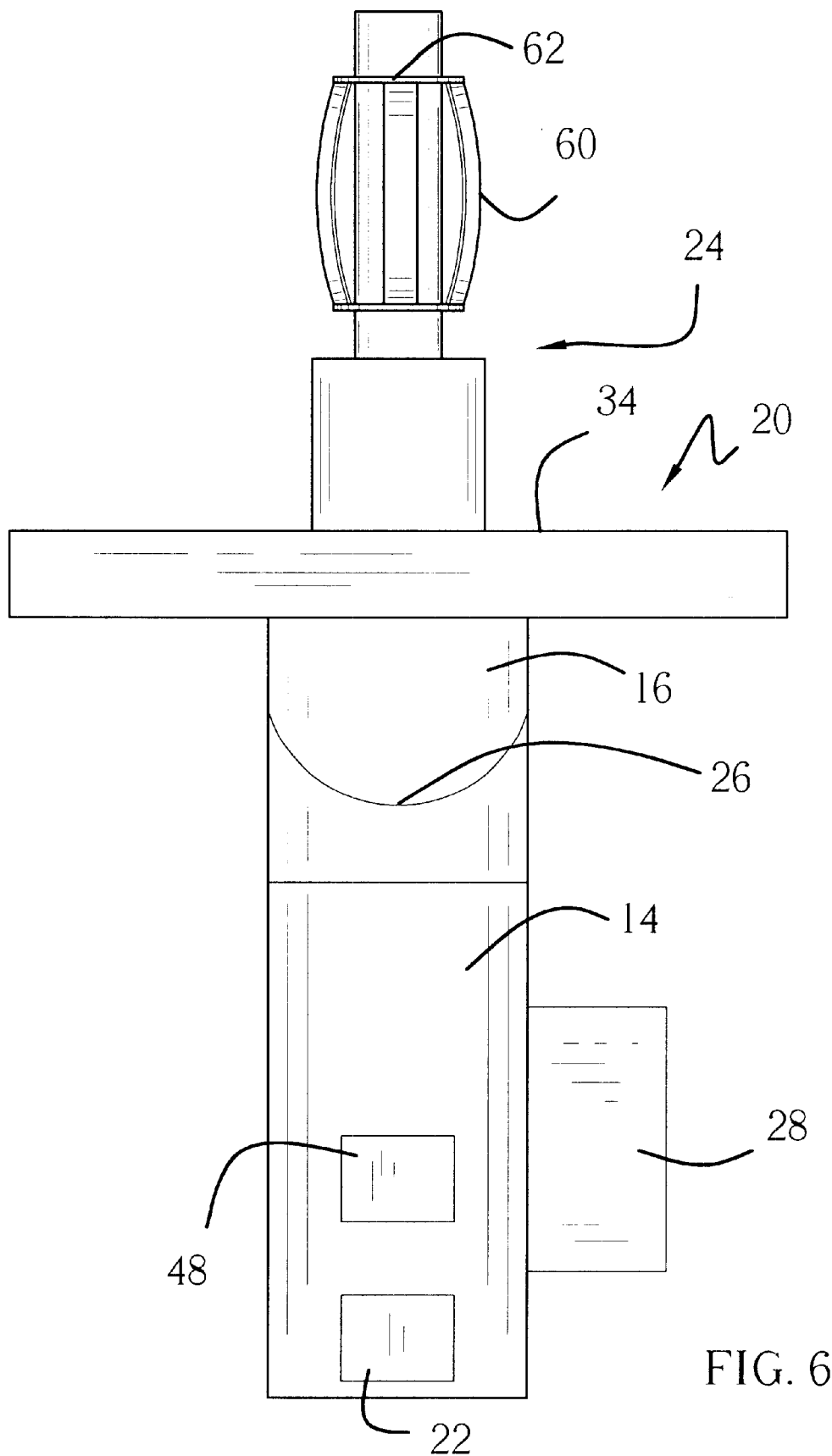
FIG. 6 is a side view of the present invention.
Figure 7:
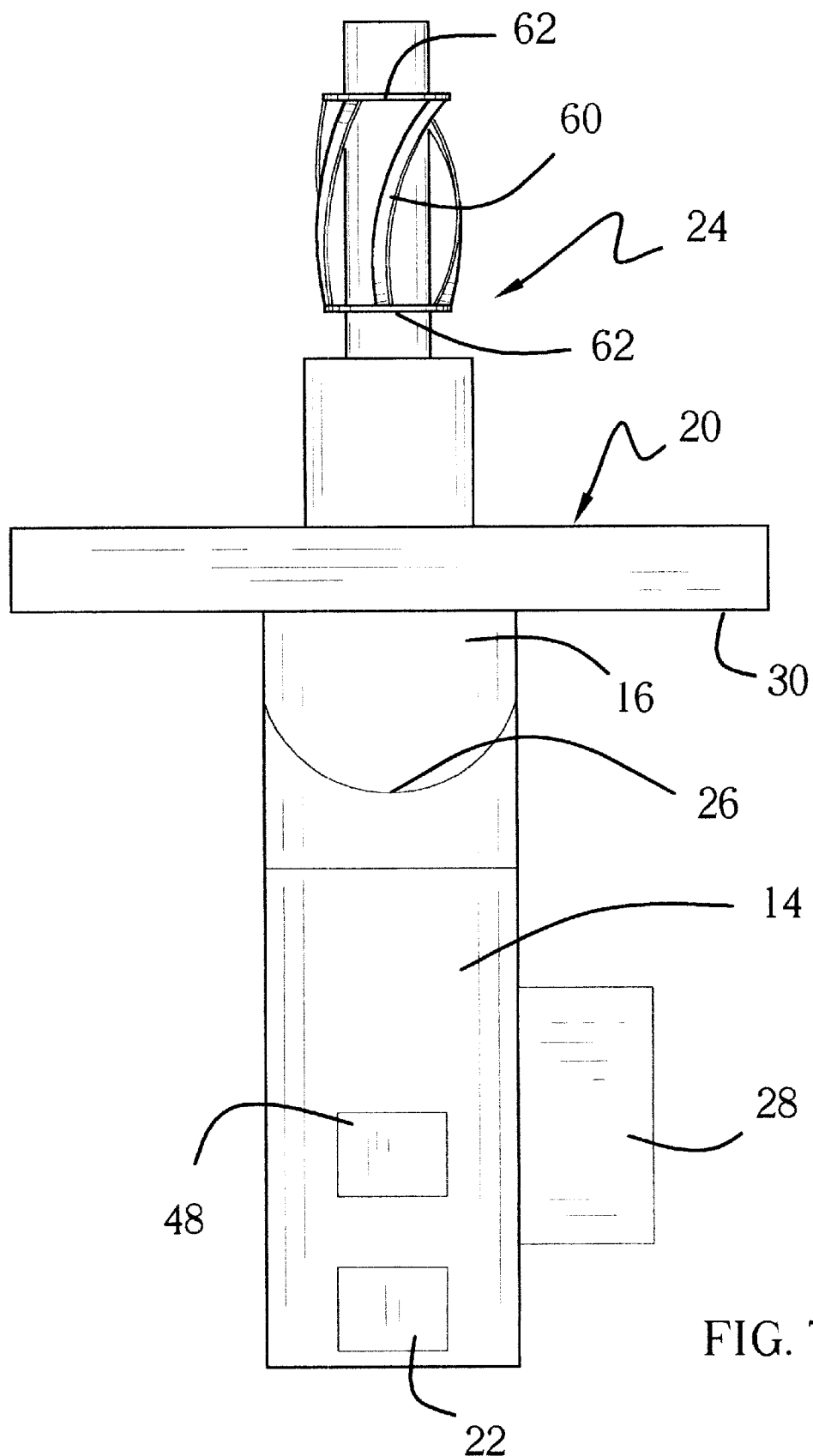
FIG. 7 is a side view of the present invention.

With reference now to the drawings, and in particular to FIGS. 1 through 7 thereof, a new power generator embodying the principles and concepts of the present invention and generally designated by the reference numeral 10 will be described.

As best illustrated in FIGS. 1 through 7, the power generator 10 generally includes a base assembly 12 that has a lower portion 14 and an upper portion 16. The lower portion 14 is adapted for resting on a support surface 18. The lower portion 14 is for supporting the upper portion 16 of the base assembly 12. A solar assembly 20 is coupled to the upper portion 16 of the base assembly 12. The solar assembly 20 is adapted for collecting solar radiation and converting the solar radiation into electricity. A power storage assembly 22 is operationally coupled to the solar assembly 20. The power storage assembly 22 is adapted for storing electricity from the solar assembly 20. The power storage assembly 22 is positioned within the lower portion 14 of the base assembly 12 such that the lower portion 14 of the base assembly 12 is adapted for protecting the power storage assembly 22 from adverse weather. A turbine assembly 24 is coupled to the upper portion 16 of the base assembly 12. The turbine assembly 24 is adapted for producing electricity from wind. The turbine assembly 24 is operationally coupled to the power storage assembly 22 such that the power storage assembly 22 is adapted for storing electricity produced from the turbine assembly 24.

The base assembly 12 has a junction portion 26. The junction portion 26 is positioned between the lower portion 14 and the upper portion 16. The junction portion 26 is rotatably coupled to the lower portion 14 of the base assembly 12 such that the junction portion 26 is rotatable with respect to the lower portion 14 of the base assembly 12. The upper portion 16 is pivotally coupled to the junction portion 26 such that the upper portion 16 pivots with respect to the junction portion 26. The junction portion 26 is adapted for permitting the solar assembly 20 to be directed towards the sun. The junction portion 26 is adapted for permitting the turbine assembly 24 to be directed into the wind.

A processing assembly 28 is operationally coupled to the junction portion 26 of the base assembly 12. The processing assembly 28 is for effecting rotation of the junction portion 26 with respect to the lower portion 14 of the base assembly 12 and pivoting of the upper portion 16 with respect to the junction portion 26 when the solar assembly 20 is to be directed towards the sun and the turbine assembly 24 is to be directed into the wind.

The solar assembly 20 includes a plate portion 30. The plate portion 30 is coupled to the upper portion 16 of the base assembly 12. The solar assembly 20 includes a plurality of solar cells 32. Each of the solar cells 32 is positioned on an upper surface 34 of the plate portion 30. Each of the solar cells 32 is adapted for converting solar radiation into electricity. Each of the solar cells 32 is operationally coupled to the power storage assembly 22 such that the power storage assembly 22 stores electricity from each the solar cells 32.

The turbine assembly 24 includes a head assembly 36 and a stanchion 38. The stanchion 38 is coupled to the upper portion 16 of the base assembly 12 such that the stanchion 38 upwardly extends from the solar assembly 20. The head assembly 36 is rotatably coupled to the stanchion 38 at the end opposite to the base assembly 12. The head assembly 36 is adapted to be rotated with respect to the stanchion 38 of the turbine assembly 24 when the head assembly 36 is directed into the wind. The turbine assembly 24 has a shroud sleeve 40. The shroud sleeve 40 upwardly extends from the solar assembly 20. The shroud sleeve 40 has a lumen 42 such that the stanchion 38 extends through the lumen 42 of shroud sleeve 40. The stanchion 38 is retractable with the shroud sleeve 40 such that the head assembly 36 is retractable into the lumen 42 of shroud sleeve 40 for protecting the head assembly 36 from adverse weather.

The head assembly 36 includes a pair of blades 44. Each of the blades 44 is coupled to a shaft 46. One of the blades 44 diametrically extends away from the other of the blades 44. Each of the blades 44 has an airfoil cross-section such that the wind strikes the blades 44 and forces the blades 44 into rotary motion thereby rotating the shaft 46. The shaft 46 is operationally coupled to a generator 48.

The blades 44 include a first blade 50 and a second blade 52. The first blade 50 is coupled to the shaft 46. The second blade 52 has a collar 54. The collar 54 has an aperture 56 such that the aperture 56 of the collar 54 is for receiving the shaft 46. The collar 54 has a cut out 58. The cut out 58 receives the first blade 50 when the second blade 52 is positioned diametrically to the first blade 50 such that the blades 44 are balanced when the blades 44 are rotated by the wind. The collar 54 of the second blade 52 permits rotation of the second blade 52 adjacent to the first blade 50 for facilitating storage of the head assembly 36.

In an embodiment the head assembly 36 of the turbine assembly 24 has a plurality of vanes 60. Each of the vanes 60 extends between a pair of annular rings 62. Each of the annular rings 62 is coupled to the stanchion 38 such that the vanes 60 are spaced around the stanchion 38. Each of the vanes 60 is adapted for catching the wind for rotating the annular rings 62 such that rotation of the annular rings 62 rotates the stanchion 38. The stanchion 38 is coupled to a generator 48. The generator 48 is adapted for producing electricity when the wind strikes the blades 44 and rotates the shaft 46.

Each of the vanes 60 includes a flexible material. The flexible material of each of the vanes extends parallel to a longitudinal axis of the stanchion 38 such that the flexible material of the vanes 60 is adapted for flexing and catching the wind for rotating the annular rings 62 and the stanchion 38.

The annular rings 62 have an extended position. The extended position of the annular rings 62 stretches the vanes 60 vertically such that the vanes 60 are prevented from flexing and catching the wind for minimizing rotation of the annular rings 62 and the stanchion 38. The annular rings 62 have a deployed position. A distance between the annular rings 62 is less than a length of each of the vanes 60 when the annular rings 62 are in the deployed position such that the vanes 60 are adapted for flexing and catching the wind for turning the annular rings 62 and the stanchion 38.

A light stanchion 64 can be operationally coupled to the urbine generator 48 apparatuses for supplying power to the light tanchion 64 in remote locations.

In use, the present invention would allow a user to provide lights in a remote area. The lights would be powered either by the wind generator or the photovoltaic cells.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A turbine generator apparatus for generating electricity from solar radiation and wind, the turbine generator apparatus comprising:

a base assembly having a lower portion and an upper portion, said lower portion being adapted for resting on a support surface, said lower portion being for supporting said upper portion of said base assembly;

a solar assembly being coupled to said upper portion of said base assembly, said solar assembly being adapted for collecting solar radiation and converting the solar radiation into electricity;

a power storage assembly being operationally coupled to said solar assembly, said power storage assembly being adapted for storing electricity from said solar assembly, said power storage assembly being positioned within said lower portion of said base assembly such that said lower portion of said base assembly is adapted for protecting said power storage assembly from adverse weather;

a turbine assembly being coupled to said upper portion of said base assembly, said turbine assembly being adapted for producing electricity from wind, said turbine assembly being operationally coupled to said power storage assembly such that said power storage assembly is adapted for storing electricity produced from said turbine assembly; and said base assembly having a junction portion, said junction portion being positioned between said lower portion and said upper portion, said junction portion being rotatably coupled to said lower portion of said base assembly such that said junction portion is rotatable with respect to said lower portion of said base assembly, said upper portion being pivotally coupled to said junction portion such that said upper portion pivots with respect to said junction portion, said junction portion being adapted for permitting said solar assembly to be directed towards the sun, said junction portion being adapted for permitting said turbine assembly to be directed into the wind.

2. The turbine generator apparatus as set forth in claim 1, further comprising:

a processing assembly being operationally coupled to said junction portion of said base assembly, said processing assembly being for effecting rotation of said junction portion with respect to said lower portion of said base assembly and pivoting of said upper portion with respect to said junction portion when said solar assembly is to be directed towards the sun and said turbine assembly is to be directed into the wind.

3. The turbine generator apparatus as set forth in claim 1, further comprising:

said solar assembly comprising a plate portion, said plate portion being coupled to said upper portion of said base assembly, said solar assembly comprising a plurality of solar cells, each of said solar cells being positioned on an upper surface of said plate portion, each of said solar cells being adapted for converting solar radiation into electricity, each of said solar cells being operationally coupled to said power storage assembly such that said power storage assembly stores electricity from each said solar cells.

4. The turbine generator apparatus as set forth in claim 1, further comprising:

said turbine assembly comprising a head assembly and a stanchion, said stanchion being coupled to said upper portion of said base assembly such that said stanchion upwardly extends from said solar assembly, said head assembly being rotatably coupled to said stanchion opposite said base assembly, said head assembly being adapted for being rotated with respect to said stanchion of said turbine assembly when said head assembly is directed into the wind.

5. The turbine generator apparatus as set forth in claim 4, further comprising:

said turbine assembly having a shroud sleeve, said shroud sleeve being upwardly extending from said solar assembly, said shroud sleeve having a lumen such that said stanchion is extending through said lumen of said shroud sleeve, said stanchion being retractable with said shroud sleeve such that said head assembly is retractable into said lumen of shroud sleeve for protecting said head assembly from adverse weather.

6. The turbine generator apparatus as set forth in claim 4, further comprising:

said head assembly comprising a pair a blades, each of said blades being coupled to a shaft, one of said blades diametrically extending away from the other of said blades, each of said blades having an airfoil cross-section such that the wind striking said blades forces said blades into rotary motion thereby rotating said shaft, said shaft being operationally coupled to a generator.

7. The turbine generator apparatus as set forth in claim 6, further comprising:

said blades comprising a first blade and a second blade, said first blade being coupled to said shaft, said second blade having a collar, said collar having an aperture such that said aperture of said collar being for receiving said shaft, said collar having a cut out, said cut out receiving said first blade when said second blade is positioned diametrically to said first blade such that said blades are balanced when said blades are rotated by the wind, said collar of said second blade permitting rotation of said second blade adjacent to said first blade for facilitating storage of said head assembly.

8. The turbine generator apparatus as set forth in claim 4, further comprising:

said head assembly of said turbine assembly having a plurality of vanes, each of said vanes extending between a pair of annular rings, each of said annular rings being coupled to said stanchion such that said vanes are spaced around said stanchion, each of said vanes being adapted for catching the wind for rotating said annular rings such that rotation of said annular rings rotates said stanchion, said stanchion being coupled to a generator, said generator being adapted for producing electricity when the wind strikes said blades and rotates said shaft.

9. The turbine generator apparatus as set forth in claim 8, further comprising:

each of said vanes comprising a flexible material, said flexible material of each of said vanes extending parallel to an longitudinal axis of said stanchion such that said flexible material of said vanes is adapted for flexing and catching the wind for rotating said annular rings and said stanchion.

10. The turbine generator apparatus as set forth in claim 9, further comprising:

said annular rings having an extended position, said extended position of said annular rings stretching said vanes vertically such that said vanes are prevented from flexing and catching the wind for minimizing rotation of said annular rings and said stanchion.

11. The turbine generator apparatus as set forth in claims, further comprising:

said annular rings having a deployed position, a distance between said annular rings being less than a length of each of said vanes when said annular rings are in said deployed position such that said vanes are adapted for flexing and catching the wind for turning said annular rings and said stanchion.

12. A turbine generator apparatus for generating electricity from solar radiation and wind, the turbine generator apparatus comprising:

a base assembly having a lower portion and an upper portion, said lower portion being adapted for resting on a support surface, said lower portion being for supporting said upper portion of said base assembly;

a solar assembly being coupled to said upper portion of said base assembly, said solar assembly being adapted for collecting solar radiation and converting the solar radiation into electricity;

a power storage assembly being operationally coupled to said solar assembly, said power storage assembly being adapted for storing electricity from said solar assembly, said power storage assembly being positioned within said lower portion of said base assembly such that said lower portion of said base assembly is adapted for protecting said power storage assembly from adverse weather;

a turbine assembly being coupled to said upper portion of said base assembly, said turbine assembly being adapted for producing electricity from wind, said turbine assembly being operationally coupled to said power storage assembly such that said power storage assembly is adapted for storing electricity produced from said turbine assembly;

wherein said base assembly having a junction portion, said junction portion being positioned between said lower portion and said upper portion, said junction portion being rotatably coupled to said lower portion of said base assembly such that said junction portion is rotatable with respect to said lower portion of said base assembly, said upper portion being pivotally coupled to said junction portion such that said upper portion pivots with respect to said junction portion, said junction portion being adapted for permitting said solar assembly to be directed towards the sun, said junction portion being adapted for permitting said turbine assembly to be directed into the wind;

wherein a processing assembly being operationally coupled to said junction portion of said base assembly, said processing assembly being for effecting rotation of said junction portion with respect to said lower portion of said base assembly and pivoting of said upper portion with respect to said junction portion when said solar assembly is to be directed towards the sun and said turbine assembly is to be directed into the wind;

wherein said solar assembly comprising a plate portion, said plate portion being coupled to said upper portion of said base assembly, said solar assembly comprising a plurality of solar cells, each of said solar cells being positioned on an upper surface of said plate portion, each of said solar cells being adapted for converting solar radiation into electricity, each of said solar cells being operationally coupled to said power storage assembly such that said power storage assembly stores electricity from each said solar cells;

wherein said turbine assembly comprising a head assembly and a stanchion, said stanchion being coupled to said upper portion of said base assembly such that said stanchion upwardly extends from said solar assembly, said head assembly being rotatably coupled to said stanchion at the end opposite to said base assembly, said head assembly being adapted for being rotated with respect to said stanchion of said turbine assembly when said head assembly is directed into the wind;

wherein said turbine assembly having a shroud sleeve, said shroud sleeve being upwardly extending from said solar assembly, said shroud sleeve having a lumen such that said stanchion is extending through said lumen of said shroud sleeve, said stanchion being retractable with said shroud sleeve such that said head assembly is retractable into said lumen of shroud sleeve for protecting said head assembly from adverse weather;

wherein said head assembly comprising a pair a blades, each of said blades being coupled to a shaft, one of said blades diametrically extending away from the other of said blades, each of said blades having an airfoil cross-section such that the wind striking said blades forces said blades into rotary motion thereby rotating said shaft, said shaft being operationally coupled to a generator;

wherein said blades comprising a first blade and a second blade, said first blade being coupled to said shaft, said second blade having a collar, said collar having an aperture such that said aperture of said collar being for receiving said shaft, said collar having a cut out, said cut out receiving said first blade when said second blade is positioned diametrically to said first blade such that said blades are balanced when said blades are rotated by the wind, said collar of said second blade permitting rotation of said second blade adjacent to said first blade for facilitating storage of said head assembly.

13. A turbine generator apparatus for generating electricity from solar radiation and wind, the turbine generator apparatus comprising:

a base assembly having a lower portion and an upper portion, said lower portion being adapted for resting on a support surface, said lower portion being for supporting said upper portion of said base assembly;

a solar assembly being coupled to said upper portion of said base assembly, said solar assembly being adapted for collecting solar radiation and converting the solar radiation into electricity;

a power storage assembly being operationally coupled to said solar assembly, said power storage assembly being adapted for storing electricity from said solar assembly, said power storage assembly being positioned within said lower portion of said base assembly such that said lower portion of said base assembly is adapted for protecting said power storage assembly from adverse weather;

a turbine assembly being coupled to said upper portion of said base assembly, said turbine assembly being adapted for producing electricity from wind, said turbine assembly being operationally coupled to said power storage assembly such that said power storage assembly is adapted for storing electricity produced from said turbine assembly; and said turbine assembly comprising a head assembly and a stanchion, said stanchion being coupled to said upper portion of said base assembly such that said stanchion upwardly extends from said solar assembly, said head assembly being rotatably coupled to said stanchion at the end opposite to said base assembly, said head assembly being adapted for being rotated with respect to said stanchion of said turbine assembly when said head assembly is directed into the wind.

14. The turbine generator apparatus as set forth in claim 13, further comprising:

said turbine assembly having a shroud sleeve, said shroud sleeve being upwardly extending from said solar assembly, said shroud sleeve having a lumen such that said stanchion is extending through said lumen of said shroud sleeve, said stanchion being retractable with said shroud sleeve such that said head assembly is retractable into said lumen of shroud sleeve for protecting said head assembly from adverse weather.

15. The turbine generator apparatus as set forth in claim 13, further comprising:

said head assembly comprising a pair of blades, each of said blades being coupled to a shaft, one of said blades diametrically extending away from the other of said blades, each of said blades having an airfoil cross-section such that the wind striking said blades forces said blades into rotary motion thereby rotating said shaft, said shaft being operationally coupled to a generator.

16. The turbine generator apparatus as set forth in claim 15, further comprising:

said blades comprising a first blade and a second blade, said first blade being coupled to said shaft, said second blade having a collar, said collar having an aperture such that said aperture of said collar being for receiving said shaft, said collar having a cut out, said cut out receiving said first blade when said second blade is positioned diametrically to said first blade such that said blades are balanced when said blades are rotated by the wind, said collar of said second blade permitting rotation of said second blade adjacent to said first blade for facilitating storage of said head assembly.

17. The turbine generator apparatus as set forth in claim 13, further comprising:

said head assembly of said turbine assembly having a plurality of vanes, each of said vanes extending between a pair of annular rings, each of said annular rings being coupled to said stanchion such that said vanes are spaced around said stanchion, each of said vanes being adapted for catching the wind for rotating said annular rings such that rotation of said annular rings rotates said stanchion, said stanchion being coupled to a generator, said generator being adapted for producing electricity when the wind strikes said blades and rotates said shaft.

18. The turbine generator apparatus as set forth in claim 17, further comprising:

each of said vanes comprising a flexible material, said flexible material of each of said vanes extending parallel to an longitudinal axis of said stanchion such that said flexible material of said vanes is adapted for flexing and catching the wind for rotating said annular rings and said stanchion.

19. The turbine generator apparatus as set forth in claim 18, further comprising:

said annular rings having an extended position, said extended position of said annular rings stretching said vanes vertically such that said vanes are prevented from flexing and catching the wind for minimizing rotation of said annular rings and said stanchion.

20. The turbine generator apparatus as set forth in claim 18, further comprising:

said annular rings having a deployed position, a distance between said annular rings being less than a length of each of said vanes when said annular rings are in said deployed position such that said vanes are adapted for flexing and catching the wind for turning said annular rings and said stanchion.

* * * * *